US005505876A

United States Patent [19]

Rivas et al.

[11] Patent Number: 5,505,876

[45] Date of Patent: Apr. 9, 1996

[54] EMULSION OF VISCOUS HYDROCARBON IN WATER WHICH INHIBITS AGING

[75] Inventors: Hercilio Rivas; Maria L. Ventresca; Gerardo Sanchez, all of Caracas, Venezuela

[73] Assignee: Intevep, Caracas, Venezuela

[21] Appl. No.: 260,478

[22] Filed: Jun. 14, 1994

Related U.S. Application Data

[62] Division of Ser. No. 746,985, Aug. 19, 1991, Pat. No. 5,354,504.

[51] Int. Cl.[6] ................................ B01J 13/00; F17D 1/16

[52] U.S. Cl. .............................. 252/311; 252/312; 44/301

[58] Field of Search .................................... 252/312, 314, 252/311, 311.5; 44/300, 301; 137/13

[56] References Cited

U.S. PATENT DOCUMENTS

| | | | |
|---|---|---|---|
| 4,251,229 | 2/1981 | Naka et al. | 252/356 |
| 4,305,835 | 12/1981 | Barber et al. | 252/51.5 A |
| 4,539,099 | 9/1985 | Merchant et al. | 208/177 |
| 4,551,239 | 11/1985 | Merchant et al. | 252/358 |
| 4,646,771 | 3/1987 | Prasad et al. | 137/13 |
| 4,814,094 | 3/1989 | Blair, Jr. et al. | 166/274 |
| 4,949,743 | 8/1990 | Broom | 252/312 |
| 4,983,319 | 1/1991 | Gregoli et al. | 252/314 |
| 5,354,504 | 10/1994 | Rivas et al. | 252/314 |

OTHER PUBLICATIONS

M. I. Briceno et al., "Emulsion Technology for the Production and Handling of Extra-Heavy Crude Oils and Bitumins", *Revista Technica INTEVEP,* 10(1):5–14 Jun. 5, 1990.

*Primary Examiner*—Richard D. Lovering
*Assistant Examiner*—Daniel S. Metzmaier
*Attorney, Agent, or Firm*—Bachman & LaPointe

[57] ABSTRACT

A low viscosity, non-aging hydrocarbon in water emulsion formed from a viscous hydrocarbon comprises from about 70 to 80%/wt. oil, from about 20 to 30%/wt. water, from about 0.1 to 5.0%/wt. of an emulsifying agent, and an average oil droplet size of greater than or equal to 15 microns wherein the emulsion is characterized by a viscosity of less or equal to 1500 centipoise at 80° F. and substantial non-aging over time wherein the change in viscosity of the emulsion is less than 100 centipoise per month.

13 Claims, 2 Drawing Sheets

EMULSION OF VISCOUS HYDROCARBON IN WATER WHICH INHIBITS AGING

This is a Division, of application Ser. No. 07/746,985, filed Aug. 19, 1991, which issued on Oct. 11, 1994 as U.S. Pat. No. 5,354,504.

BACKGROUND OF THE INVENTION

The present invention is drawn a method for the preparation of a hydrocarbon in water emulsion from viscous hydrocarbons and, more particularly, a method for the preparation of low-viscosity hydrocarbon in water emulsions from viscous hydrocarbons wherein aging of the emulsion over time is substantially eliminated.

The viscous hydrocarbons (below 12 ° API gravity) found in Canada, the Soviet Union, the United States, China, and Venezuela, are liquids having viscosities running from 10,000 to 500,000 centipoise at room temperature. Normally, these viscous hydrocarbons are produced by mechanical pumping alone, mechanical pumping combined with steam injection, and through mining techniques. To make hydrocarbons of this kind more commercially valuable, it is necessary to develop methods to increase the effectiveness and profitability of their transportation and storage thereby facilitating their subsequent use as raw materials in the derivation of other products or in other applications. Processes have been conceived to modify these hydrocarbons so as to change them into a pumpable form and make it possible to move them through conventional pipes. Among the most common processes is that of forming emulsions of these hydrocarbons in water. The emulsions have much lower viscosity than the hydrocarbon alone and thus can be pumped at a faster speed through the pipe lines with conventional pumping equipment.

The aforesaid emulsions are prepared using surfactants, which can be cationic, anionic, and/or non-ionic. Their preparation involves a large number of variables, both physical-chemical (covering the formulation of the emulsion) and mechanical (relating to the method and speeds of stirring). These variables are very important, since the stability of the emulsion, that is, that their component phases do not separate out and that their viscosity remains constant over time, depends upon these variables.

Several methods have been proposed for forming emulsions of hydrocarbons in water using chemical additives, thereby reducing the viscosity of the hydrocarbons so as to make them transportable.

Typical processes are described in U.S. Pat. Nos. 3,380,531; 3,467,159; 3,487,844; 3,006,354; 3,425,429; 3,467,195; 3,519,006; 3,943,954; 4,099,537; 4,108,193; 4,239,052, 4,249,554; 4,627,458; and 4,795,478. They involve the use of sodium or ammonium hydroxide, non-ionic, anionic, and cationic surfactants, or combinations thereof.

The foregoing methods produce stable emulsions from the point of view of the coalescence of their phases. However, a problem which has not been resolved to date is that of controlling or eliminating the phenomenon of aging which affects these emulsions. By aging is meant the progressive increase in the viscosity of the emulsion over time. One technique used to prevent aging involves the addition of electrolytes which involves an additional cost in the process of preparation of the emulsions.

Naturally, it would be highly desirable to provide a method for preparation of hydrocarbon in water emulsions from viscous hydrocarbons wherein aging of the emulsion over time is substantially eliminated.

Accordingly, it is the principle object of the present invention to provide a method for the preparation of hydrocarbon in water emulsions from viscous hydrocarbons wherein the aging of the emulsion over time is substantially eliminated.

It is the principle object of the present invention to provide a method as aforesaid wherein the final emulsion exhibits a viscosity of less than or equal to 1500 centipoise at 80° F.

It is a further object of the present invention to provide a method for the preparation of hydrocarbon in water emulsions as aforesaid wherein the average oil droplet size in the final emulsion product is greater than or equal to 15 microns.

It is a still further object of the present invention to provide a method for the preparation of hydrocarbon in water emulsions from viscous hydrocarbons as aforesaid wherein the hydrocarbon is the natural occurring crude, tar or other natural occurring hydrocarbon or residual fuel oil characterized by a viscosity of greater than 100 centipoise at 122° F. and an API gravity of greater than or equal to 16° API.

Further objects and advantage of the present invention will appear hereinbelow.

SUMMARY OF THE INVENTION

The present invention is drawn to a method for the preparation of a hydrocarbon in water emulsion from viscous hydrocarbons and, more particularly, a method for the preparation of low-viscosity hydrocarbon in water emulsions from viscous hydrocarbons wherein aging of the emulsion over time is substantially eliminated.

The method in accordance with the present invention comprises the steps of first forming a concentrated emulsion by admixing a viscous hydrocarbon with emulsifier and water so as to obtain a water content in an amount of less than or equal to 15%/wt. The aforesaid mixture is thereafter heated to a temperature of between 120° F. and about 200° F. and thereafter the heated mixture is stirred under controlled conditions so as to obtain a concentrated hydrocarbon in water emulsion having an average oil droplet size of less than or equal to 4 microns. After obtaining the concentrated emulsion, a final emulsion is prepared by first diluting the concentrated hydrocarbon in water emulsion with water so as to obtain a water content of less than or equal 30%/wt. The diluted mixture is thereafter heated to a temperature of between 140° F. to about 220° F. The heated diluted mixture is then stirred under controlled conditions so as to obtain a final hydrocarbon in water emulsion having an average oil droplet size of greater than or equal to 15 microns wherein the viscosity of the final emulsion is less than or equal to 1500 centipoise at 1 $s^{-1}$ and 80° F.

The hydrocarbon in water emulsion produced by the method as aforesaid results in an emulsion which is not only stable but which is substantially impervious to the aging phenomena heretofore exhibited by hydrocarbon in water emulsions produced by prior art processes.

DETAILED DESCRIPTION

The method of the present invention allows for the preparation of hydrocarbon in water emulsions from viscous hydrocarbons wherein aging of the emulsions over time is substantially eliminated.

Figure 1:
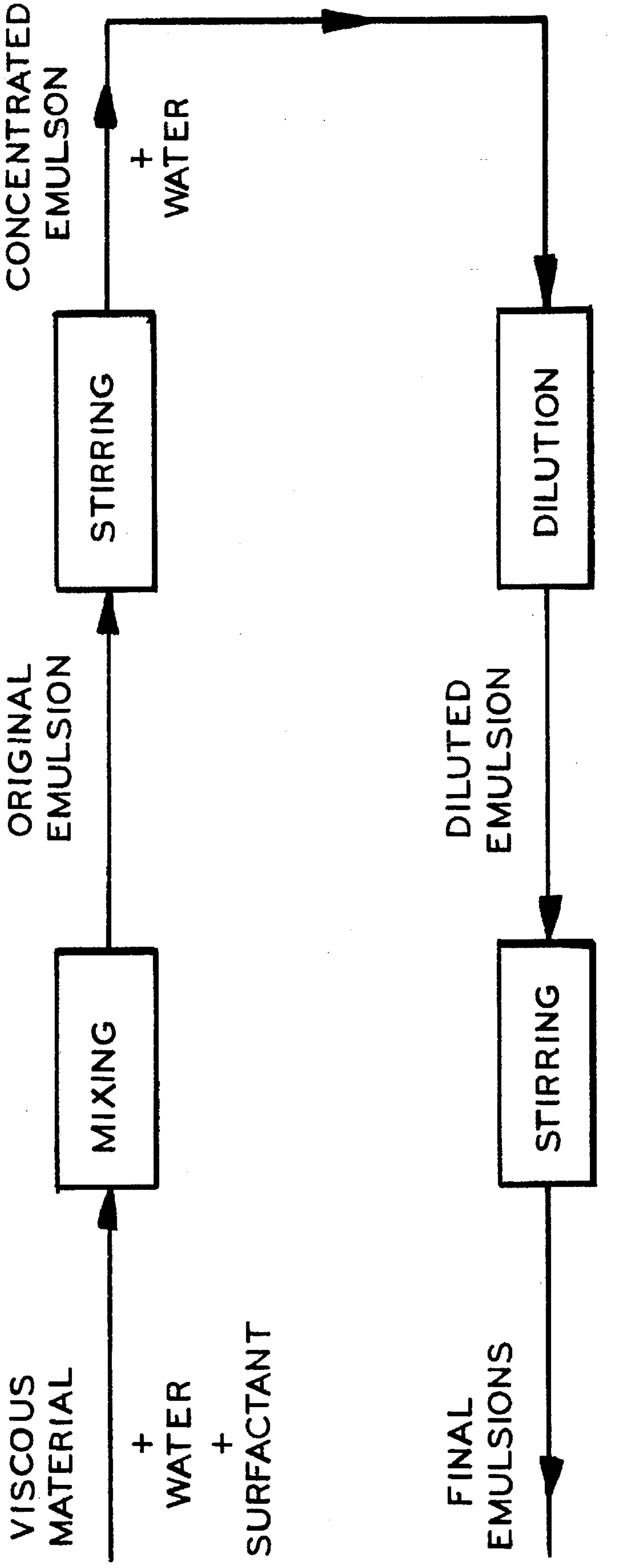
FIG. 1 is a schematic diagram showing the steps for preparing a hydrocarbon in water emulsion according to the method of the present invention.

FIG. 1 is a schematic diagram showing the steps for preparing hydrocarbon in water emulsion from a viscous hydrocarbon in accordance with the method of the present invention. The process of the present invention is particularly suitable for viscous hydrocarbons having the following physical and chemical properties: ° API gravity of between 1 and 16; viscosity at 122° F. of between 100,000 and 500,000 centipoise; viscosity at 210° F. of between 10,000 and 16,000 centipoise; asphaltene content of between 5 and 25%/wt.; resin content of between 3 and 30%/wt.; carbon content of between 78.2 and 85.5%/wt.; hydrogen content of between 9.0 and 10.8%/wt.; oxygen content of between 0.25 and 1.1%/wt.; nitrogen content of between 0.5 and 0.7%/wt.; sulfur content of between 2.0 and 4.5%/wt.; vanadium content of between 50 to 1000 ppm; nickel content of between 20 to 500 ppm; iron content of between 5 to 100 ppm; sodium content of between 10 to 500 ppm; and ash content of between 0.55 and 0.3%/wt. The viscous hydrocarbons may be in the form of heavy crude oils, naturally occurring bitumens, naturally occurring tars, heavy residuals, and the like.

In accordance with the method of the present invention, the non-aging hydrocarbon in water emulsion is prepared by first forming a concentrated emulsion. With reference to FIG. 1, the concentrated hydrocarbon in water emulsion is formed by admixing a viscous hydrocarbon with water and an emulsifying additive. The amount of water admixed with the hydrocarbon and emulsifying additive is such as to insure that the water content in the concentrated emulsion is less than or equal to 15%/wt. water. The emulsifying additive is added in an amount of between 0.1 and 5.0%/wt., preferably between 0.1 and 1.0%/wt., based on the total weight of the concentrated hydrocarbon in water emulsion.

The preferred emulsifying additive for use in the method of the present invention comprises a mixture of either a non-ionic surfactant or anionic surfactant with a phenol-formaldehyde-ethoxylated resin. The phenol-formaldehyde-ethoxylated resin is combined with the surfactant in an amount of between 1 to 10%/wt. preferably 1 to 5%/wt. based on the total weight of the emulsifying additive.

Useful non-ionic surfactants for use in the method of the present invention include ethoxylated alkyl phenol, ethoxylated alcohols, and esters of ethoxylated sorbitan compounds. Preferred non-ionic surfactants should have a hydrophylic-lipophylic balance (HLB) of greater than 13. Preferred non-ionic surfactants include alkyl phenol ethoxylates. Particularly useful anionic surfactants include alkyl arylsulphonates and alkyl arylsulfates and surfactants derived from long-chain carboxylic acids. Preferred anionic surfactants include those having a HLB of greater than 13, for example, ammonium alkylaryl sulphonates such as dodecyl benzenesulphonate. The phenol-formaldehyde-ethoxylated resin preferably has from 3 to 7 ethoxy units.

The admixed viscous hydrocarbon, water and emulsifying additive is then heated to a temperature of about between 120° F. to 200° F. and the heated mixture is thereafter stirred under controlled conditions so as to form a concentrated hydrocarbon in water emulsion having an average oil droplet size of less than or equal to 4 microns. In accordance with the present invention, the heated mixture is stirred in a high-speed mixer at an rpm of less than or equal to 2000 rpm and, preferably, between 1000 and 1500 rpm.

The concentrated hydrocarbon in water emulsion is then diluted with water so as to obtain a water content of between 20 to 30%/wt., preferably 28%/wt. The diluted mixture is then heated to a temperature of between about 140° F. and 220° F., preferably between 180° F. and 220° F. The heated diluted emulsion is then subjected to shearing in a high-speed mixer at speeds of up to 4500 rpm and preferably between 3500 and 4500 rpm so as to obtain a final hydrocarbon in water emulsion product having an average oil droplet size of greater than or equal to 15 microns and a viscosity of less than or equal 1500 centipoise at 80° F.

The non-aging hydrocarbon in water emulsion formed in accordance with the method of the present invention comprises preferably from about 70 to 80%/wt. oil, from about 20 to 30%/wt. water, from about 0.1 to 5%/wt. of an emulsifying agent, an average oil droplet size of greater than or equal to 15 microns, and a viscosity of less than or equal to 1500 centipoise at 1 $s^{-1}$ and 80° F. The aging factor of the non-aging hydrocarbon in water emulsion is an average change in viscosity of less than 100 centipoise per month and preferably 100 centipoise per year. By aging factor is meant the change in viscosity at a given temperature over time. In accordance with the preferred embodiment of the present invention the non-aging hydrocarbon contains an emulsifying agent which comprises a mixture of either a non-ionic surfactant with a phenol-formaldehyde-ethoxylated resin or an anionic surfactant with a phenol-formaldehyde-ethoxylated resin wherein the phenol-formaldehyde-ethoxylated resin is combined with the surfactant in an amount of between 1 to 10%/wt., preferably 1 to 5%/wt. based on the total weight of the emulsifying additive. The non-aging hydrocarbon in water emulsions produced in accordance with the method of the present invention substantially eliminate the aging phenomena which plague hydrocarbon in water emulsions formed by other known methods. The non-aging characteristics of the hydrocarbon in water emulsions formed by the method of the present invention will be made clear from the following illustrative examples.

EXAMPLE I

In order to demonstrate the effect of the method of the present invention for producing hydrocarbon in water emulsions wherein aging of the emulsion over time is substantially eliminated, a naturally occurring viscous hydrocarbon was admixed with water and an emulsifying additive. The naturally occurring viscous hydrocarbon was a Cerro Negro tar from the Orinoco Oil Belt region of Venezuela. The physical and chemical properties of the Cerro Negro tar employed in this example is set forth below.

| | 91-223 |
|---|---|
| Gravity API (60° F.) | 8.4 |
| Saturates %/wt. | 11.8 |
| Aromatics %/wt. | 45.8 |

-continued

| | 91–223 |
|---|---|
| Resins %/wt. | 30.9 |
| Asphaltenes %/wt. | 11.5 |
| Acidity, mgKOH/g of bitumen | 3.07 |
| Total nitrogen ppm | 5561 |
| Sulfur %/wt. | 3.91 |
| Nickel ppm | 105.9 |
| Vanadium ppm | 544.2 |

The emulsifying additive comprised a non-ionic surfactant in the form of an alkyl phenol ethoxylated compound sold under the trademark INTAN-100® which is a trademark of Intevep, S. A. and a phenol-formaldehyde-ethoxylated resin having 5 units of ethyl oxide. The emulsifying composition comprised 97%/wt. of the non-ionic surfactant and 3%/wt. of a phenol-formaldehyde-ethoxylated resin. The mixture comprised 93%/wt. of the Cerro Negro tar, 6.7%/wt. of distilled water, and 0.3%/wt. of the emulsifying composition described above. The mixture was heated to a temperature of 167° F. and slowly pre-mixed. The mixture was then stirred with a spiral palet at a speed of 1200 rpm to obtain a first concentrated emulsion. Four samples of the first concentrated emulsion were taken after stirring times of 2 min., 4 min., 4 min., and 4 min. respectively. The average diameter of the oil droplet size of the four samples of the first concentrated emulsion was measured and the results are set forth below in Table I.

TABLE I

| | Concentrated Emulsion | |
|---|---|---|
| Sample | Time, Minutes | Average Dia. Microns |
| 1 | 2 | 8.6 |
| 2 | 4 | 3.8 |
| 3 | 4 | 3.9 |
| 4 | 4 | 3.5 |

Each of the four samples of the first concentrated emulsion were then diluted with distilled water so as to obtain a water content of 28%/wt. The diluted emulsion was then heated to a temperature of 176° F. and stirred at a speed of 4000 rpm. The four samples were stirred for a time of 1 min., 2 min., 3 min., and 4 min., respectively. The final cooled emulsions were stored at 80° F. for 24 hours and the average oil droplet diameter was measured as was the viscosity of each of the samples. Viscosity measurements were again taken after 48 hours. The results are set forth in Table II below.

TABLE II

| | Diluted Emulsion | | | |
|---|---|---|---|---|
| | Time, | Average Dia. | Viscosity (cPs) at 1 $s^{-1}$ and 80° F. after | |
| Sample | Minutes | Microns | 24 hrs. | 48 hrs. |
| 1 | 1 | 16 | 18,610 | 20,000 |
| 2 | 2 | 7 | 7,280 | 7,300 |
| 3 | 3 | 10 | 4,124 | 4,100 |
| 4 | 4 | 15 | 500 | 250 |

Figure 2:
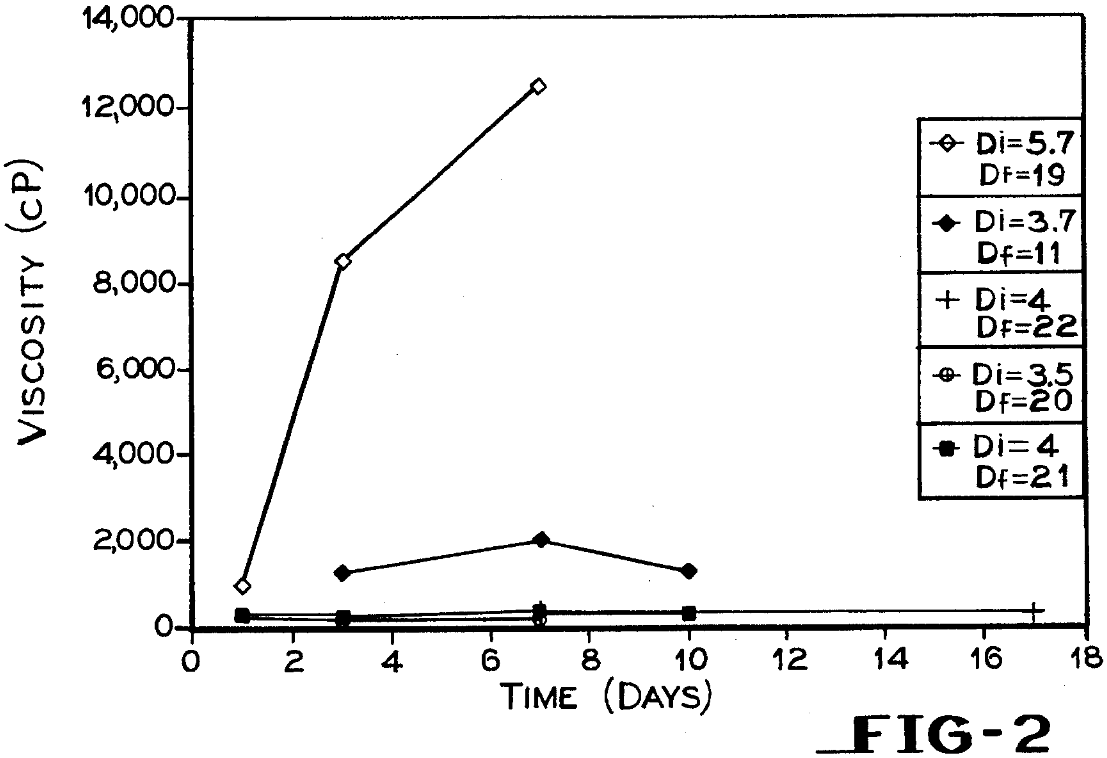
FIG. 2 is a graph of five curves showing the effect of oil droplet size on the aging of hydrocarbon in water emulsions prepared in accordance with Example II.

FIG. 2 demonstrates oil droplet diameter size in the concentrated emulsion and the final diluted emulsion has on the viscosity of the final emulsion. From Table II it can be seen that samples 2, 3, and 4 which had an average oil droplet diameter of less than 4 microns do not show virtually any aging of the final emulsion product while sample 1 which had an average oil droplet diameter of 8.6 microns in the concentrated emulsion aged when formed to a final emulsion product. In addition, it can be seen that as the average oil droplet diameter increased in the final emulsion product of samples 2, 3, and 4 the final viscosity of the product was greatly reduced. Not only was the viscosity of the final diluted emulsions improved with increased oil droplet size, the non-aging characteristics of the emulsions likewise increased with an increase in oil droplet diameter size. This example clearly demonstrates the criticality of oil droplet diameter size in both concentrated emulsion and the final diluted emulsion in order to obtain a low viscosity non-aging hydrocarbon in water emulsion in the final emulsion product. From Table II it can be seen that it is preferred that the concentrated emulsion have an average oil droplet size of less than or equal to 4 microns and that the final emulsion product have an average oil droplet size of greater than or equal to 15 microns.

EXAMPLE II

Five additional samples were prepared following the same procedure as described above in Example I with only the time of stirring being varied so as to obtain different oil droplet diameter sizes in the concentrated emulsions and the final diluted emulsions. Table III below sets forth the average oil droplet diameter for the concentrated and diluted emulsions for each of the five samples.

TABLE III

| Sample | Average Dia., Microns Concentrated Emulsion | Average Dia., Microns Diluted Emulsion |
|---|---|---|
| 1 | 5.7 | 19 |
| 2 | 3.7 | 11 |
| 3 | 3.5 | 20 |
| 4 | 4.0 | 21 |
| 5 | 4.0 | 22 |

The samples were stored at 80° F. and the viscosity of the emulsions were measured at regular time intervals for ten days in order to determine the non-aging characteristics of the emulsions. The results are summarized in FIG. 2. As can be seen from FIG. 2, again initial oil droplet size in the concentrated emulsion is important for obtaining a non-aging hydrocarbon in water emulsion. In addition, it can be seen that final oil droplet diameter is important for obtaining flow viscosity non-aging hydrocarbon in water emulsions.

EXAMPLE III

Example II was again repeated with the exception that the emulsifying composition was a mixture of 97%/wt. amonium dodecilbenzensulphonate and 3%/wt. of the same formaldehyde resin used in Example II. The average oil droplet diameter was again measured for each of the samples after the formation of the concentrated emulsion and the final diluted emulsion. The final diluted emulsions were again cooled to 80° F. and the viscosities were measured after 24 and 48 hours. The results are set forth below in Table IV.

TABLE IV

| Sample | Average Dia. Microns Concentrated Emulsions | Average Dia. Microns Diluted Emulsions | Viscosity (cPs) at 1 $s^{-1}$ after 24 hrs. | 48 hrs. |
|---|---|---|---|---|
| 1 | 4 | 15 | 600 | 8700 |
| 2 | 5 | 8 | 7200 | 7700 |
| 3 | 8 | 15 | 8700 | 9300 |

Again, it is clearly seen the criticality of obtaining an oil droplet size in the concentrated emulsion of less than or equal to 4 microns in order to reduce the viscosity of the final hydrocarbon in water emulsion as well as the non-aging characteristics of the final hydrocarbon in water emulsion.

EXAMPLE IV

Two additional samples were prepared using the emulsifier composition of Example III and following the same procedure of Example II described above. The average oil droplet diameter size for the concentrated and diluted emulsions of each of the samples is set forth below in Table V.

TABLE V

| Sample | Average Dia., Microns Concentrated Emulsion | Average Dia., Microns Diluted Emulsion |
|---|---|---|
| 1 | 6 | 15 |
| 2 | 4 | 15 |

Figure 3:
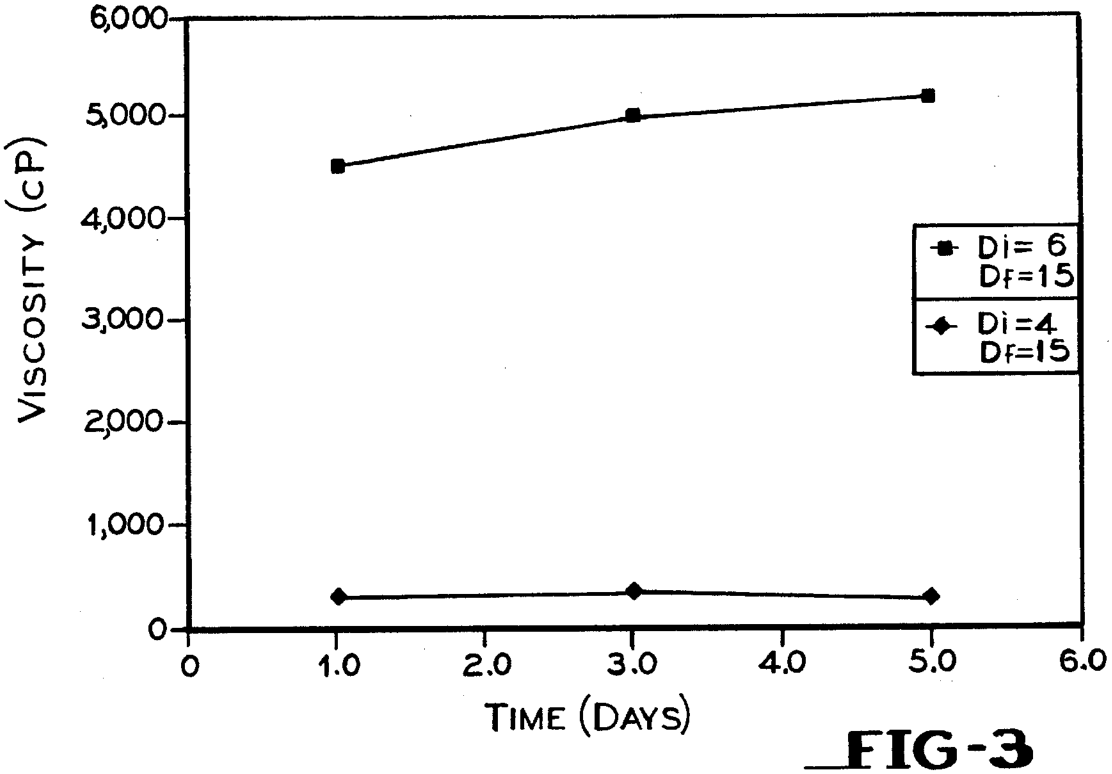
FIG. 3 is a graph of two curves showing the effect of oil droplet size on the aging of hydrocarbon in water emulsions prepared in accordance with Example IV.

The emulsions were again cooled to 80° F. and the viscosities were measured after 1 day, 3 days, and 5 days. The behavior of the emulsions with storage time are summarizes in FIG. 3. Again, it is clearly demonstrated that the oil droplet size as a concentrated emulsion is critical in obtaining a low viscosity, non-aging hydrocarbon in water emulsion.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

We claim:

1. A low viscosity , non-aging hydrocarbon in water emulsion formed from a viscous hydrocarbon comprises from about 70 to 80%/wt. oil, from about 20 to 30%/wt. water, from about 0.1 to 5.0%/wt. of an emulsifying agent; wherein said emulsifying agent comprises (1) a phenol-formaldehyde ethoxylated resin in an amount of between 1 to 10%/wt. based on the total weight of the emulsifying agent and (2) a surfactant selected from the group consisting of a nonionic surfactant and an anionic surfactant; and wherein said emulsion is characterized by an average oil droplet size of greater than or equal to 15 microns, a viscosity of less or equal to 1500 centipoise at 1 $s^{-1}$ and 80° F., and is substantially non-aging over time wherein the change in viscosity of the emulsion is less than 100 centipoise per month.

2. A hydrocarbon in water emulsion according to claim 1 wherein said viscous hydrocarbon has the following physical and chemical properties: ° API gravity of between 1 and 16; viscosity at 122° F. of between 100,000 and 500,00 centipoise; viscosity at 210° F. of between 10,000 and 16,000 centipoise; asphaltene content of between 5 and 25%/wt.; resin content of between 3 and 30%/wt.; carbon content of between 78.2 and 85.5%/wt.; hydrogen content of between 9.0 and 10.8%/wt.; oxygen content of between 0.25 and 1.1%/wt.; nitrogen content of between 0.5 and 0.7%/wt.; sulfur content of between 2.0 and 4.5%/wt.; vanadium content of between 50 to 1000 ppm; nickel content of between 20 to 500 ppm; iron content of between 5 to 100 ppm; sodium content of between 10 to 500 ppm; and ash content of between 0.55 and 0.3%/wt.

3. A hydrocarbon in water emulsion according to claim 1 wherein the change in viscosity of the emulsion is less than 100 centipoise per year.

4. A hydrocarbon in water emulsion according to claim 1 wherein said emulsifying agent comprises a non-ionic surfactant and a phenol-formaldehyde ethoxylated resin wherein said phenol-formaldehyde ethoxylated resin is present in an amount of between 1 to 5%/wt. based on the total weight of the emulsifying agent.

5. A hydrocarbon in water emulsion according to claim 4 wherein said phenol-formaldehyde ethoxylated resin is present in an amount of between 1 to 2%/wt. based on the total weight of the emulsifying agent.

6. A hydrocarbon in water emulsion according to claim 4 wherein said non-ionic surfactant has a hydrophylic-lipophylic balance of greater than 13 and said phenol-formaldehyde ethoxylated resin has from 3 to 7 ethoxy units.

7. A hydrocarbon in water emulsion according to claim 4 wherein said non-ionic surfactant is selected from the group consisting of ethoxylated alkyl phenols and esters of ethoxylated sorbitans compounds.

8. A hydrocarbon in water emulsion according to claim 1 wherein said emulsifying agent comprises an anionic surfactant and a phenol-formaldehyde ethoxylated resin wherein said phenol-formaldehyde ethoxylated resin is present in an amount of between 1 to 5%/wt. based on the total weight of the emulsifying agent.

9. A hydrocarbon in water emulsion according to claim 8 wherein said phenol-formaldehyde ethoxylated resin is present in an amount of between 1 to 2%/wt. based on the total weight of the emulsifying agent.

10. A hydrocarbon in water emulsion according to claim 8 wherein said anionic surfactant is selected from the group consisting of carboxylic acids and sulphonic acids.

11. A hydrocarbon in water emulsion according to claim 8 wherein said anionic surfactant comprises ammonia dodecylbenzenesulphonate.

12. A low viscosity, non-aging hydrocarbon in water emulsion formed from a viscous hydrocarbon comprises: from about 70 to 80%/wt. oil, from about 20 to 30%/wt. water, from about 0.1 to 5.0%/wt. of an emulsifying additive comprising an alkyl phenol ethoxylated and a phenol-formaldehyde ethoxylated resin, and an average oil droplet size of greater than or equal to 15 microns wherein said emulsion is characterized by a viscosity of less or equal to 1500 centipoise at 80° F. and substantial non-aging over time wherein the change in viscosity of the emulsion is less than 100 centipoise per month.

13. A hydrocarbon in water emulsion according to claim 12 wherein the change in viscosity of the emulsion is less than 100 centipoise per year.

* * * * *

UNITED STATES PATENT AND TRADEMARK OFFICE
CERTIFICATE OF CORRECTION

PATENT NO. : 5,505,876
DATED : April 9, 1996
INVENTOR(S) : Hercilio Rivas et al.

It is certified that error appears in the above-indentified patent and that said Letters Patent is hereby corrected as shown below:

Claim 2, line 2 of column 8, "500,00" should be --500,000--.

Signed and Sealed this

Twenty-fourth Day of September, 1996

Attest:

BRUCE LEHMAN

*Attesting Officer* *Commissioner of Patents and Trademarks*